United States Patent

[11] 3,590,790

[72] Inventors Hans Keylwert;
 Hubert Abermeth, both of Cologne, Germany
[21] Appl. No. 851,200
[22] Filed Aug. 19, 1969
[45] Patented July 6, 1971
[73] Assignee Klockner-Humboldt-Deutz Aktiengesellschaft
 Cologne-Deutz, Germany
[32] Priority Sept. 7, 1968
[33] Germany
[31] P 17 76 037.1

[54] CONTACT-FREE OIL SEAL FOR ROTARY PISTON INTERNAL COMBUSTION ENGINES
 6 Claims, 1 Drawing Fig.
[52] U.S. Cl. .................................................. 123/8.01,
 184/6, 308/187, 418/61, 418/88
[51] Int. Cl. ........................................................ F02b 53/00,
 F16c 33/74
[50] Field of Search ............................................ 308/187;
 184/6, 6 TS, 6 Z; 123/8.01, 8; 418/61, 88

[56] References Cited
UNITED STATES PATENTS
| | | | |
|---|---|---|---|
| 2,848,284 | 8/1958 | Atkinson et al. | 184/6 (Z) (UX) |
| 3,249,094 | 5/1966 | Hoppner et al. | 123/8 (LL) |
| 3,452,839 | 7/1969 | Swearingen | 184/6 |

*Primary Examiner*—Allan D. Hermann
*Attorney*—Walter Becker

ABSTRACT: A contact-free oil seal for rotary piston internal combustion engines in which between the piston and the transmission there are provided feeding and discharge conduit means for the gas change, or in other words, procedure that fresh air respectively fuel-air mixture is supplied into the combustion chamber and the exhaust gases pushed out. These conduit means are separated from the transmission chamber by an oil seal having at least two axially spaced discs connected to the piston and with narrow axial play slidingly engaging the outer wall of an annular blocking chamber connected to the housing and adapted to be placed into communication with a source of fluid pressure.

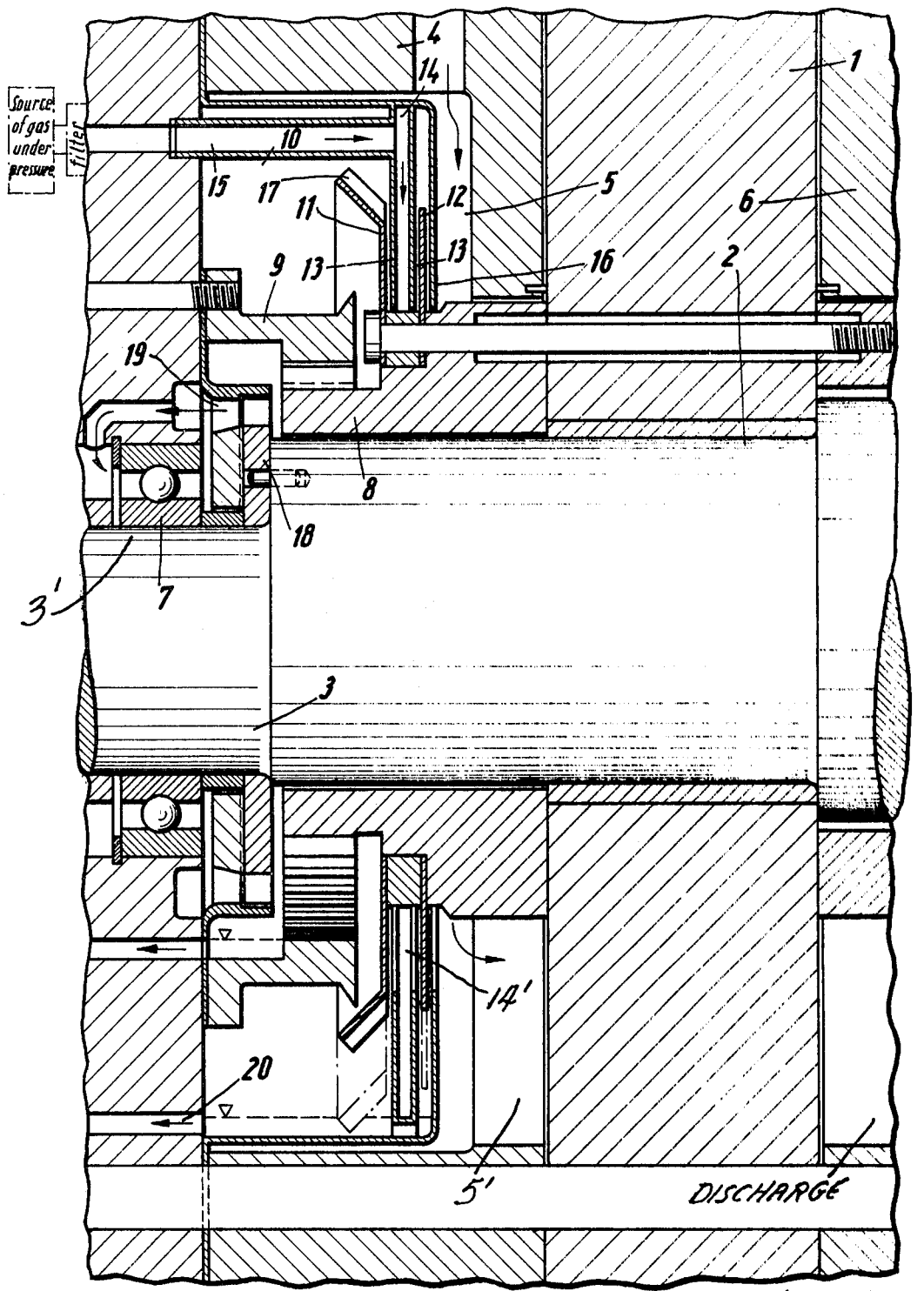

CONTACT-FREE OIL SEAL FOR ROTARY PISTON INTERNAL COMBUSTION ENGINES

The present invention relates to a contact-free oil seal for rotary piston internal combustion engines with a piston rotatable on an eccentric shaft and with a transmission for kinematically controlling said piston while the gas change is effected through the intervention of said piston, and while between said piston and said transmission there are provided conduit means for the gas change, said conduit means being separated from the transmission chamber by means of oil seals.

In conformity with U.S. Pat. No. 3,249,094, it is known in connection with rotary piston internal combustion engines to separate the oil-conducting chambers from the gas-conducting working chambers by a contact-free labyrinth seal the central piston connected part of which engages sealing parts of which one part is connected to the sidewall of the housing, whereas the other part is connected to the eccentric shaft. Between the contact-free oil seal and the working chambers, in the vicinity thereof, there are provided sealing strips in the piston which are in sliding contact with the sidewalls of the machine during the operation of the latter. The separation of oil-conducting chambers and gas-conducting chambers by means of a contact-free and a sliding seal requires relatively many parts, is expensive and decreases the degree of efficiency of the internal combustion engine.

It is, therefore, an object of the present invention to provide a contact-free oil seal of the above mentioned general type for use in connection with rotary piston internal combustion engines, which seal will be able without an additional slide ring seal to bring about an effective separation between the oil-conducting transmission chamber and the feeding and discharge conduits for the gas change. This object and other objects and advantages of the invention will appear more clearly from the following specification in connection with the accompanying drawing representing a partial transverse section through a rotary piston internal combustion engine equipped with a contact-free seal according to the invention.

The above outlined object has been realized according to the present invention by making the oil seal of at least two spaced centrifugal discs which with narrow axial play extend to the outer sidewalls of an annular blocking chamber connected to the housing and coaxial with regard to the journal pin of the eccentric shaft. The separating effect may, according to a further development of the invention, be improved by feeding a gaseous pressure medium to the blocking or barrier chamber. As pressure medium, preferably air is to be used which will pushback the oil that might enter the sealing gap under certain circumstances. The delivery of the air may be so controlled that always a small quantity passes through the sealing gap into the transmission chamber. Another part of the oil passes through the sealing gap at the piston side into the feeding or discharge conduits for the gas change. In order to assure that as great a proportion of the compressed air will be taken advantage of for displacing the oil in the transmission chamber, it is advantageous to increase the flow resistance of the sealing gap at the piston side by covering the centrifugal disc at the piston side by means of a wall fixedly connected to the housing. This brings about that the greater portion of the fed air will flow off through the sealing gap on the transmission side.

According to a further development of the invention, the sealing effect can still be further improved by providing the centrifugal disc at the transmission side with conveying means which convey the oil spray to the oil discharge. The direction of flow of the gaseous pressure medium is favorably influenced by a further development of the invention, and more specifically by a pump wheel to the eccentric shaft. This pump wheel conveys a portion of the oil fog forming in the transmission chamber to the bearing for the eccentric shaft. The pump wheel will, in the transmission chamber, bring about a slight underpressure and will also promote a proper lubrication of the bearing means for the eccentric shaft. By the above outlined means it is possible with a minimum power loss to realize an optimum blocking effect.

Referring now to the drawing in detail, the arrangement shown therein comprises a piston 1 journaled on an eccentric 2 of an eccentric shaft 3 with trunnion means 3'. Piston 1 is surrounded by a housing 4 which comprises feed lines 5 for air respectively a fuel-air mixture and also comprises discharge conduits (not shown) for the gas change, or in other words, procedure that fresh air respectively fuel-air mixture is supplied into the combustion chamber and the exhaust gases pushed out of the combustion chamber. The eccentric shaft 3 is, by means of antifriction bearings 7 journaled in the sidewalls of the housing 4. A pinion 8 which is connected to the piston will together with a hollow wheel 9 serve as transmission for the kinematic control of the piston 1. The transmission chamber 10 is separated from the feeding lines 5' by a contact-free oil seal. The oil seal comprises two spaced centrifugal discs 11 and 12 which are connected to the piston and which with a narrow axial play extend to the outer sidewalls 13 of an annular blocking or barrier chamber 14 coaxially arranged with regard to the eccentric shaft 3. A gap 14' between the sidewalls of the blocking chamber means and adjacent disc means 11, 12 communicates with the interior of the blocking chamber means. The chamber 14 is adapted to receive a gaseous medium under pressure, e.g. air under pressure, from a pressure source such as a compressor, through a filter and feeding conduit 15. The centrifugal disc 12 on the piston side is covered by a wall 16 fixedly connected to the housing. The wall means 16 is connected to housing means 4 and disc means 11, 12 are located to one side and radially inwardly from the wall means 16.

For purposes of improving the discharge of spray oil, the centrifugal disc 11 adjacent the transmission chamber is equipped with conveying devices in the form of pump blades 17 which convey the spray oil to an oil discharge conduit means 20. Between the transmission for kinematic control of the piston 1 on one hand and the antifriction bearings 7 on the other hand, the eccentric shaft 3 has connected thereto a pump wheel 18 which conveys a portion of the oil fog forming from feeding conduit means 15 and chamber 14 in the transmission chamber 10 to the antifriction bearings 7 through the intervention of a guiding device 19 which is connected to the housing.

It is, of course, to be understood that the present invention is, by no means, limited to the particular showing in the drawing but also comprises any modifications within the scope of the appended claims.

What We Claim is:

1. A rotary piston internal combustion engine which includes: housing means, an eccentric shaft having trunnion means, antifriction bearing means mounted in said housing means and journaling said trunnion means, rotary piston means arranged within said housing means and rotatably supported by said eccentric shaft means, said housing means defining a transmission chamber, conveying means arranged within said transmission chamber and drivingly connected to said eccentric shaft means, feeding and discharge conduit means for respectively feeding fuel to and discharging exhaust gases from said rotary piston means, and oil seal means interposed between and separating said transmission chamber from said feeding and discharge conduit means, said oil seal means comprising at least two disc means axially spaced from each other and drivingly connected to said rotary piston means, and annular blocking chamber means arranged within said housing means in coaxial arrangement with said trunnion means and connected to said housing means, said blocking chamber means comprising sidewalls respectively in sliding engagement with said at least two disc means, the gap between the sidewalls of said blocking chamber means and the adjacent disc means communicating with the interior of said blocking chamber means.

2. A rotary piston internal combustion engine according to claim 1, which includes wall means connected to said housing means and also includes disc means arranged adjacent said rotary piston means and having a radially outer peripheral wall, said wall means covering said radially outer peripheral wall of said last-mentioned disc means.

3. A rotary piston internal combustion engine according to claim 1, which includes disc means which is adjacent said transmission chamber and is provided with conveying means for conveying spray oil to a discharge.

4. A rotary piston internal combustion engine according to claim 1, which includes a pump wheel connected to said eccentric shaft for conveying a portion of the oil mist forming in said transmission chamber to said antifriction bearing means.

5. A rotary piston internal combustion engine according to claim 1, which includes filter means associated with said blocking chamber means for filtering the pressure medium admitted to said blocking chamber means.

6. A rotary piston internal combustion engine according to claim 1, which includes means associated with said blocking chamber means for connecting a source of a gaseous medium under pressure with the interior of said blocking chamber means.